United States Patent [19]

Murakami et al.

[11] Patent Number: 4,737,012
[45] Date of Patent: Apr. 12, 1988

[54] INFRARED LIGHT TRANSMISSION FIBER

[75] Inventors: Kazuhito Murakami; Kenichi Takahashi, both of Osaka, Japan

[73] Assignee: Sumitomo Electric Industries, Ltd., Osaka, Japan

[21] Appl. No.: 14,210

[22] Filed: Feb. 5, 1987

Related U.S. Application Data

[63] Continuation of Ser. No. 602,268, Apr. 23, 1984, which is a continuation of Ser. No. 268,514, May 29, 1981, abandoned.

[30] Foreign Application Priority Data

May 29, 1980 [JP] Japan .................................. 55-70835

[51] Int. Cl.$^4$ ................................................. G02B 6/44
[52] U.S. Cl. .................. 350/96.23; 350/96.30
[58] Field of Search ............... 350/96.23, 96.34, 96.29, 350/96.30

[56] References Cited

U.S. PATENT DOCUMENTS

| | | | |
|---|---|---|---|
| 4,072,400 | 2/1978 | Claypoole et al. | 350/96.23 |
| 4,113,349 | 9/1978 | Stiles | 350/96.23 |
| 4,189,208 | 2/1980 | Grodkiewicz et al. | 350/96.34 |
| 4,213,672 | 7/1980 | Aulich et al. | 350/96.23 |
| 4,253,731 | 3/1981 | Anderson et al. | 350/96.34 |
| 4,304,462 | 12/1981 | Baba et al. | 350/96.23 |
| 4,315,667 | 2/1982 | Nakagome et al. | 350/96.34 |
| 4,342,500 | 8/1982 | Oestreich et al. | 350/96.23 |
| 4,432,607 | 2/1984 | Levy | 350/96.34 |

FOREIGN PATENT DOCUMENTS

| | | | |
|---|---|---|---|
| 2556861 | 7/1976 | Fed. Rep. of Germany | 350/96.23 |
| 2296192 | 7/1976 | France | 350/96.23 |
| 1568178 | 5/1980 | United Kingdom | 350/96.23 |

Primary Examiner—William L. Sikes
Assistant Examiner—Frank González
Attorney, Agent, or Firm—Sughrue, Mion, Zinn, Macpeak & Seas

[57] ABSTRACT

An infrared light transmission fiber comprising an optical fiber made of an infrared light transmitting material which is covered with a reinforcing layer formed by impregnating glass fibers with a thermosetting varnish and curing the same is disclosed. The optical fiber may have a primary coating of cured thermosetting resin provided on the optical fiber and/or a coating of an elastic material provided on the reinforcing layer.

5 Claims, 1 Drawing Sheet

INFRARED LIGHT TRANSMISSION FIBER

This is a continuation of application Ser. No. 06/602,268, filed Apr. 23, 1984, which is a continuation of Ser. No. 06/268,514, filed May 29, 1981, now abandoned.

FIELD OF THE INVENTION

This invention relates to an improvement of an infrared light transmission fiber, and more particularly to an infrared light transmission fiber having increased strength.

BACKGROUND OF THE INVENTION

With the advance of research on optical fibers, the scope of their commercial application has expanded to not only transmission of information but also other fields including transmission of light energy. An infrared light transmission fiber primarily used for transmission of light energy must be made of a material that suits to transmit the infrared light rays. Materials that are known to meet this requirement are as follows:

(1) silver halides and mixtures thereof;
(2) thallium halides and mixtures thereof;
(3) alkali metal halides or alkaline earth metal halides and mixtures thereof;
(4) chalcogenides; and
(5) mixtures of (1), (2) and (3).

The materials of the groups (1) and (2) above are flexible and can be bent easily at a temperature around room temperatures but unlike silica glass that is a typical material for fibers for optical communication and which bends elastically, these materials bend through plastic deformation and are difficult to return to the original shape. Furthermore, the part that has undergone plastic deformation has microscopic defects that cause increased transmission loss, or it sometimes occurs that the part that has undergone repeated plastic deformations fails. Similar properties are observed in the materials classified into (3), (4) and (5) above, which also have the defect of brittleness which is another factor that limits the practical use of these materials. The strength of these materials is significantly lower than that of silica glass, and its tensile strength is from several tens to several hundreds times less than that of silica glass. Among factors that limit the practical use of these materials are sensitivity to visible and ultraviolet rays, hygroscopicity, low strength and great deformation.

SUMMARY OF THE INVENTION

Therefore, one object of this invention is to provide an infrared light transmission fiber that is free from the above-mentioned defects of the conventional product and which uses a material suited for the purpose of infrared light transmission and yet has sufficient strength to expand the scope of its practical application.

This object can be achieved by an infrared light transmission fiber comprising an optical fiber made of an infrared light transmitting material and a reinforcing layer which covers the outer surface of the optical fiber and which is formed by impregnating glass fibers with a thermosetting resin and curing the thermosetting resin. The fiber according to the present invention preferably has a primary coating of a cured thermosetting resin which covers the outer surface of the optical fiber. Further, the fiber according to the present invention preferably has a coating of an elastic material which covers the outer surface of the reinforcing layer.

DETAILED DESCRIPTION OF THE INVENTION

Figure 1:
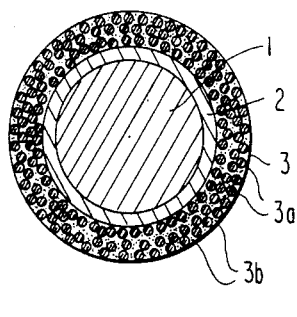
FIGS. 1 and 2 are cross sections of an infrared light transmission fiber according to different embodiments of this invention.
Figure 2:
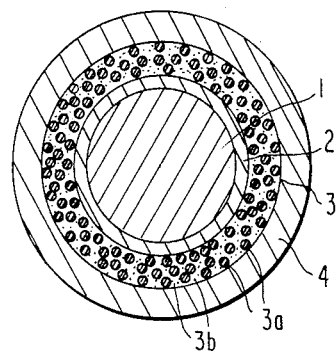

One embodiment of this invention is hereunder described by reference to the accompanying drawings. As shown in FIGS. 1 and 2, the infrared light transmission fiber of this invention comprises an optical fiber 1 made of any of the infrared light transmitting materials (1) to (5) described above which is optionally covered with a primary coating 2 of a thermosetting resin which is further covered with a reinforcing layer 3 formed by impregnating glass fibers 3a with resin 3b which is then cured. More effective reinforcement is achieved by covering the layer 3 with an elastic layer 4 made of an elastic resin. Having this elastic layer 4, the infrared light transmission fiber of this invention can be provided with protective and reinforcing coverings as are the existing optical communication cables and transmission lines.

The primary coating 2, reinforcing layer 3 and elastic layer 4 are formed around the optical fiber 1 by the following procedure.

First, the primary coating 2 is formed by applying a resin onto the periphery of the optical fiber 1 made of an infrared light transmitting material, and to avoid sensitization by ultraviolet and visible rays, moisture absorption and mechanical damage, the coating 2 is desirably formed as soon as possible after the formation of the optical fiber 1 and before it contacts other machines and devices.

Figure 3:
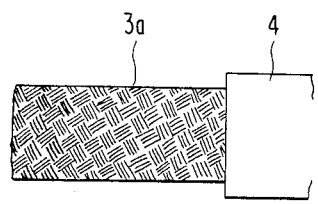
FIGS. 3 and 4 schematically represent how glass fibers are wound around the primary coating on an optical fiber made of an infrared light transmitting material.
Figure 4:
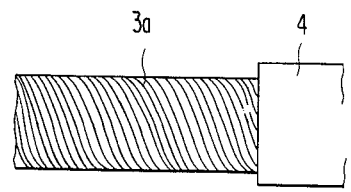

The reinforcing layer 3 is formed around the primary coating 2 or the optical fiber 1 if the primary coating is not used by covering it with glass fibers 3a and impregnating the fibers with thermosetting varnish 3b. Covering with the glass fibers need not be done simultaneously with impregnation with the thermosetting resin, but for achieving effective reinforcement, care must be taken that the resin 3b fills all gaps between the glass fibers 3a and that the primary coating 2 is in intimate contact with the reinforcing layer 3. The glass fibers 3a may be braided as shown in FIG. 3 or wound helically as shown in FIG. 4.

It is not particularly required that the resin 3b be of the same type as the resin of which the primary coating 2 is made, but it is necessary that the two resins provide layers that make intimate contact with each other. One advantage of using the same resin is that only one heat treatment is necessary with a resultant shortening of the process of manufacturing infrared light transmitting fibers. In most cases, the reinforcing layer 3 may be formed even before the resin for the primary coating 2 sets completely, and the temperature and time for heating the resin 3b may be so determined that the primary coating 2 sets as the resin 3b is being heat set. Examples of the resin include polyester imide, polyimide, polyamide-imide, polyester, polyurethane and polyvinyl formal.

The above embodiment assumes that the optical fiber 1 is covered with the primary coating 2, reinforcing layer 3 and elastic layer 4, but for the purpose of this invention, the optical fiber 1 need only be covered with the reinforcing layer 3, and more effective reinforcement is ensured by the primary coating 2 that indirectly provides intimate contact between the layer 3 and the optical fiber 1. The reinforcing layer 3 is covered with the elastic layer 4 that isolates the optical fiber 1 from external forces that accompany the working of providing the infrared light transmitting fiber with coverings that are commonly used to protect electric wires.

This invention is now described in greater detail by reference to the following example which is given here only for the purpose of illustrating the advantages of the invention and is by no means intended to limit its scope.

EXAMPLE

Silver chloride fibers hot extruded into a diameter of 0.7 mm were coated with resin layers of polyester, polyester imide, polyurethane and polyvinyl formal, and heat-cured at 200° C. for 30 minutes. The cured products were covered with a coating of braided glass fibers which were then impregnated with the same resins and again heat-cured. The breaking strength of the fiber having the primary coating and that of the fiber having both primary coating and braided glass fiber coating are shown in Table 1. The uncoated fiber had a breaking strength of 0.6 kg.

TABLE 1

| Resin | Conditions of Heat Curing after Braiding | | Breaking Strength after Application of Primary Coating (kg) | Breaking Strength after Braiding (kg) |
| --- | --- | --- | --- | --- |
| | Heating Temp. (°C.) | Heating Time (hr) | | |
| Polyester Imide | 200 | 2 | 10 | 27 |
| Polyester | 200 | 2 | 0.8 | 37 |
| Polyurethane | 200 | 1 | 0.7 | 10 |
| Polyvinyl Formal | 200 | 2 | 0.8 | 11 |

As is clear from the table, the reinforced fibers were free from any local bending and had increased resistance from working stresses that were exerted when coatings of elastic materials such as silicon resin, rubber and many plastic or metal coatings were formed on the secondary coating. The elastic coating is effective for distributing a compressive stress or flexural stress on the optical fiber or for reducing the resulting great impact. The coating of braided or helically wound glass fibers is not only effective against torsion stress but because of impregnation with a varnish, it also has increased resistance against tensile stress.

As described in the foregoing by reference to the example, this invention provides an infrared light transmission fiber that uses an infrared light transmitting material and which yet has increased strength to expand its practical applicability greatly.

While the invention has been described in detail and with reference to specific embodiments thereof, it will be apparent to one skilled in the art that various changes and modifications can be made therein without departing from the spirit and scope thereof.

What is claimed is:

1. An infrared light transmission fiber comprising:

a single optical fiber made of an infrared light transmitting material, said material being selected from (1) silver halide or a mixture of silver halides, (2) thallium halide or a mixture of thallium halides, (3) alkali metal halides or alkaline earth metal halides, or mixtures thereof, (4) a chalcogenide, (5) a mixture of (a) silver halides and mixtures thereof, (b) thallium halides and mixtures thereof, and (c) alkali metal halides or alkaline earth metal halides, or mixtures thereof, a primary coating of a cured thermosetting resin which covers the outer surface of said single optical fiber, said primary resin consisting essentially of a resin selected from the group consisting of polyester imide, polyimide, polyamide-amide, polyester, polyurethane or polyvinyl formal, and a reinforcing layer covering only said primary coating of said single optical fiber and consisting essentially of glass fibers impregnated with a thermosetting resin which is cured after impregnation, said resin of the reinforcing layer being the same as the resin for the primary coating.

2. The infrared light transmission fiber according to claim 1, wherein a coating of an elastic material is provided on said reinforcing layer.

3. The infrared light transmission fiber according to claim 1, wherein the infred light transmitting material is non-clad AgCl.

4. The infrared light transmission fiber according to claim 1, wherein the diameter of the infrared light transmitting material is 0.7 mm.

5. The infrared light transmission fiber according to claim 1, wherein the infrared light transmitting material is AgCl.

* * * * *